United States Patent
Fan et al.

(10) Patent No.: US 11,586,880 B2
(45) Date of Patent: Feb. 21, 2023

(54) SYSTEM AND METHOD FOR MULTI-HORIZON TIME SERIES FORECASTING WITH DYNAMIC TEMPORAL CONTEXT LEARNING

(71) Applicants: Beijing Jingdong Shangke Information Technology Co., Ltd., Beijing (CN); JD.com American Technologies Corporation, Mountain View, CA (US)

(72) Inventors: Chenyou Fan, Mountain View, CA (US); Yuze Zhang, Mountain View, CA (US); Rong Yuan, Mountain View, CA (US); Chi Zhang, Fremont, CA (US); Di Wu, Mountain View, CA (US)

(73) Assignees: BEIJING JINGDONG SHANGKE INFORMATION TECHNOLOGY CO., LTD., Beijing (CN); JD.COM AMERICAN TECHNOLOGIES CORPORATION, Mountain View, CA (US)

(*) Notice: Subject to any disclaimer, the term of this patent is extended or adjusted under 35 U.S.C. 154(b) by 758 days.

(21) Appl. No.: 16/541,120

(22) Filed: Aug. 14, 2019

(65) Prior Publication Data

US 2020/0074274 A1 Mar. 5, 2020

Related U.S. Application Data

(60) Provisional application No. 62/723,696, filed on Aug. 28, 2018.

(51) Int. Cl.
*G06N 3/04* (2006.01)
*G06N 3/049* (2023.01)
(Continued)

(52) U.S. Cl.
CPC ............ *G06N 3/049* (2013.01); *G06F 17/11* (2013.01); *G06N 3/0418* (2013.01); *G06N 3/084* (2013.01)

(58) Field of Classification Search
CPC .............................. G06N 3/049; G06N 3/084
See application file for complete search history.

(56) References Cited

PUBLICATIONS

Bai et al ("An Experimental Study of Text Representation Methods for Cross-Site Purchase Preference Prediction Using the Social Text Data" 2017) (Year: 2017).*

(Continued)

*Primary Examiner* — Lut Wong
(74) *Attorney, Agent, or Firm* — Scully, Scott, Murphy & Presser, P.C.

(57) ABSTRACT

A system and a method for time series forecasting. The method includes: providing input feature vectors corresponding to a plurality of future time steps; performing bi-directional long-short term memory network (BiLSTM) on the input feature vectors to obtain hidden outputs corresponding to the plurality of future time steps; for each future time step: performing temporal convolution on the hidden outputs using a plurality of temporal scales to obtain context features at the plurality of temporal scales, and summating the context features at the plurality of temporal scales using a plurality of weights to obtain multi-scale context features; and converting the multi-scale context features to obtain the time series forecasting corresponding to the future time steps.

16 Claims, 8 Drawing Sheets

(51) Int. Cl.
G06F 17/11 (2006.01)
G06N 3/084 (2023.01)

(56) References Cited

PUBLICATIONS

Cheng et al ("Multi-Scale LSTM Model for BGP Anomaly Classification" Apr. 2018) (Year: 2018).*
Kumar et al ("Knowledge-enriched Two-layered Attention Network for Sentiment Analysis" Jun. 16, 2018) (Year: 2018).*
Neverova et al ("A multi-scale approach to gesture detection and recognition" 2013) (Year: 2013).*
Box, GEP. and Jenkins, GM, Some recent advances in forecasting and control, Journal of the Royal Statistical Society, 1968, vol. 17, No. 2, pp. 91-109.
Cinar, YG, Mirisaee, H, et al., Position-based content attention for time series forecasting with sequence-to-sequence RNNS, Advances in Neural Information Processing Systems, 2017.
Donahue, J, Hendricks LA, et al., Long-term recurrent convolutional networks for visual recognition and description, IEEE Conference on Computer Vision and Pattern Recognition, 2015.
Friedman, JH, Greedy function approximation: a gradient boosting machine, Annals of Statistics, 2001, vol. 29, No. 5, pp. 1189-1232.
Holt, CC, Forecasting seasonals and trends by exponentially weighted moving averages, International Journal of Forecasting, 2004, vol. 20, Issue 1, pp. 5-10.
Hong, T, Pinson, P et al., Probabilistic energy forecasting: Global energy forecasting competition 2014 and beyond, International Journal of Forecasting, 2016, vol. 32, Issue 3, pp. 896-913.
Ingma, DP, BA, JL, Adam: A method for stochastic optimization, International Conference on Learning Representations (ICLR) 2015.
Krizhevsky, A, Sutskever, I, Hinton, GE, ImageNet classification with deep convolutional neural networks, Advances in Neural Information Processing Systems, 2012.
Long, J, Shelhamer, E, Darrell, T, Fully convolutional networks for semantic segmentation, 2015 IEEE conference on computer vision and pattern recognition (CVPR), 2015.
Mikolov, T, Sutskever, I, et al., Distributed representations of words and phrases and their compositionality, Advances in Neural Information Processing Systems, 2013.
Oord, AVD, Dieleman S, et al., WaveNet: A generative model for raw audio, 2016, arXiv preprint arXiv:1609.03499.
Paszke, A, Gross, S, et al., Automatic differentiation in PyTorch, 2017.
Salinas, D, Flunkert, V, Gasthaus J, DeepAR: Probabilistic forecasting with autoregressive recurrent networks, 2017.
Sutskever, H, Vinyals, O, Le QV, Sequence to sequence learning with neural networks, Advances in Neural Information Processing Systems, 2014.
Wen, R, Torkkola, K, et al., A multi-horizon quantile recurrent forecaster, 2017, arXiv preprint arXiv:1711.11053.
Winters, P, Forecasting sales by exponentially weighted moving averages, Management science, 1960, vol. 6, No. 3, pp. 324-342.

* cited by examiner

Table 1

| | Methods | \multicolumn{7}{c}{Quantile Loss} | |
| --- | --- | --- | --- | --- | --- | --- | --- | --- |
| | | 0.85 | 0.87 | 0.90 | 0.95 | 0.97 | 0.99 | Total 15 |
| | Benchmark | 7.35 | 13.35 | 16.31 | 3.44 | 5.08 | 2.39 | 78.76 |
| | Gradient-Boosting | 6.51 | 14.21 | 15.74 | 3.30 | 4.87 | 2.59 | 79.28 |
| Baselines | POS-RNN (Cinar et al. 2017) | 6.47 | 13.74 | 16.36 | 4.59 | 5.17 | 2.40 | 78.02 |
| | MQ-RNN (Wen et al. 2017) | 6.67 | 13.74 | 16.41 | 4.56 | 5.20 | 2.32 | 78.52 |
| | LSTM-Enc-Dec | 6.31 | 13.52 | 16.22 | 4.44 | 4.74 | 2.37 | 77.40 |
| | BiLSTM-Dec | 6.29 | 13.48 | 15.89 | 4.38 | 4.71 | 2.25 | 76.14 |
| Our approach | TpConv-RNN | 6.23 | 13.43 | 15.47 | 4.44 | 4.52 | 2.17 | 74.58 |
| | TpConv-D-RNN | 6.29 | 13.04 | 15.47 | 4.34 | 4.63 | 2.28 | 74.36 |

FIG. 7

Table 2

| | Methods | Quantile Loss | | | | | |
|---|---|---|---|---|---|---|---|
| | | 0.01 | 0.25 | 0.50 | 0.75 | 0.99 | Avg |
| Baselines | Benchmark | 3.82 | 3.75 | 3.67 | 3.60 | 3.53 | 3.67 |
| | Gradient-Boosting | 1.34 | 3.96 | 4.37 | 3.44 | 0.55 | 3.17 |
| | POS-RNN (Cinar et al. 2017) | 0.22 | 2.76 | 3.82 | 3.86 | 1.90 | 3.05 |
| | MQ-RNN (Wen et al. 2017) | 0.18 | 2.48 | 3.48 | 3.43 | 1.37 | 2.68 |
| | LSTM-Enc-Dec | 0.18 | 2.51 | 3.49 | 3.42 | 0.99 | 2.72 |
| | BiLSTM-Dec | 0.18 | 2.52 | 3.46 | 3.17 | 0.63 | 2.64 |
| Our approach | TpConv-RNN | 0.17 | 2.46 | 3.42 | 3.17 | 0.62 | 2.58 |
| | TpConv-D-RNN | 0.18 | 2.41 | 3.20 | 2.97 | 0.61 | 2.48 |

FIG. 8

Table 3

| Target Category | Nearest Neighbors |
|---|---|
| Paper | Pen, Folder, Stationery, Flash Disk |
| Mouse | Keyboard, Flash Disk, Paper, Stationery, Router |
| Milk | Cereal, Grains, Dried fruit, Coffee and milk tea |
| Roasted nuts | Dried meat, Rice, Cereal, Beverage |

FIG. 9

SYSTEM AND METHOD FOR MULTI-HORIZON TIME SERIES FORECASTING WITH DYNAMIC TEMPORAL CONTEXT LEARNING

CROSS-REFERENCES

This application claims priority to and the benefit of, pursuant to 35 U.S.C. § 119(e), U.S. provisional patent application Ser. No. 62/723,696, filed Aug. 28, 2018, which is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates generally to time series forecasting, and more specifically related to an end-to-end deep-learning framework for multi-horizon time series forecasting, with novel structures to better capture temporal contexts on future horizons.

BACKGROUND OF THE DISCLOSURE

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Time series forecasting problem is to study how to predict the future accurately based on historical observations. Classical time series forecasting approaches include Holt-Winters method (Holt 2004; Winters 1960) and ARIMA (Box and Jenkins 1968). These models are ineffective in modeling highly nonlinear time series. Recently, Recurrent Neural Networks (RNNs), and the mostly used variant Long Short-Term Memory Networks (LSTMs), have been proposed for modeling complicated sequential data, such as natural language (Sutskever, Vinyals, and Le 2014), audio waves (Oord et al. 2016), and video frames (Donahue et al. 2015). However, existing LSTM-based approaches fail to explore temporal patterns on long future horizons.

Therefore, an unaddressed need exists in the art to address the aforementioned deficiencies and inadequacies.

SUMMARY OF THE DISCLOSURE

In certain aspects, the present disclosure relates to a method for time series forecasting of a product. In certain embodiments, the method includes:

providing input feature vectors of the product corresponding to a plurality of future time steps;

performing bi-directional long-short term memory network (BiLSTM or Bi-LSTM) on the input feature vectors to obtain hidden states corresponding to the plurality of future time steps;

for each future time step: performing temporal convolution on the hidden state using a plurality of temporal scales to obtain context features at the plurality of temporal scales, and summating the context features at the plurality of temporal scales using a plurality of weights to obtain multi-scale context features; and converting the multi-scale context features to obtain the time series forecasting corresponding to the future time steps.

In certain embodiments, the step of providing input feature vectors includes:

providing time series input variables corresponding to the plurality of future time steps of the product;

embedding the time series input variables to feature vectors; and for each of the future time step of the product:

concatenating the feature vectors of the time step to obtain a long vector; and forming one of the input feature vectors from the long vector using a fully-connected layer.

In certain embodiments, the plurality of temporal scales comprises 2-10 scales. In certain embodiments, the plurality of temporal scales comprises four scales of scale-1, scale-3, scale-5, and scale-7; for each target step from the future time steps: the scale-1 uses hidden state of the target step; the scale-3 uses hidden states of the target step, one of the future time steps immediately before the target step, and one of the time steps immediately after the target step; the scale-5 uses hidden states of the target step, two of the future time steps immediately before the target step, and two of the time step immediately after the target step; and the scale-7 uses hidden states of the target step, three of the future time steps immediately before the target step, and three of the time step immediately after the target step.

In certain embodiments, context features at scale 3 is obtained by:

$$c_{t+2}^3 = g_3(1) \cdot h_{t+1} + g_3(0) \cdot h_{t+2} + g_3(-1) \cdot h_{t+3} \quad (1),$$

where $c_{t+2}^3$ is context feature at time step t+2 and scale-3, $h_t$ is hidden output at time t, and $g_3$ is a temporal convolutional filter of size 1×3.

In certain embodiments, the method further includes obtaining the plurality of weights by:

generating an S-dimension importance vector w by w=f($h^e$), where f is a multilayer perceptron, $h^e$ is encoded history representation of historical data; and normalizing w by softwmax operation:

$$\alpha_i = \frac{\exp(w_i)}{\sum_{j=1}^{s} \exp(w_j)},$$

wherein S is a number of context scales considered, $\alpha_i$ is normalized importance of i-th scale.

In certain embodiments, each of the multi-scale context features c is determined by: $c = \sum_{i=1}^{S} \alpha_i c^i$, wherein $c^i$ is context features of different scales.

In certain embodiments, output at one of the future time steps is determined using a linear transformation y=Wc+b, wherein y is K quantile estimation, $y \in R^K$, and W and b are learned using the historical data.

In certain embodiments, the method further includes: providing a hidden state of a time step immediately before a first future time step of the future time steps.

In certain embodiments, the hidden state of the time step immediately before the first time step is obtained using a two layer LSTM encoder using input features and outputs corresponding to previous time steps.

In certain aspects, the present disclosure relates to a system for time series forecasting of a product. In certain embodiments, the system includes a computing device. The computing device includes a processor and a storage device storing computer executable code. The computer executable code, when executed at the processor, is configured to perform the method described above In certain aspects, the present disclosure relates to a non-transitory computer readable medium storing computer executable code. The computer executable code, when executed at a processor of a computing device, is configured to perform the method described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 7 shows experiment results of baselines and the models according to certain embodiments of the present disclosure on GOC2018 Sales Forecasting task.

FIG. 8 shows experiment results of baselines and the models according to certain embodiments of the present disclosure on GEFCom2014 electricity price results.

FIG. 9 shows nearest neighbors of different product categories with cosine distances smaller than 0.25 according to certain embodiments of the disclosure.

DETAILED DESCRIPTION

Figure 2A:
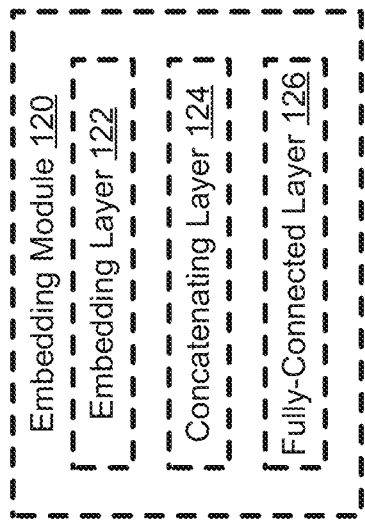
FIG. 2A schematically depicts an embedding module for time series forecasting according to certain embodiments of the disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

Figure 1:
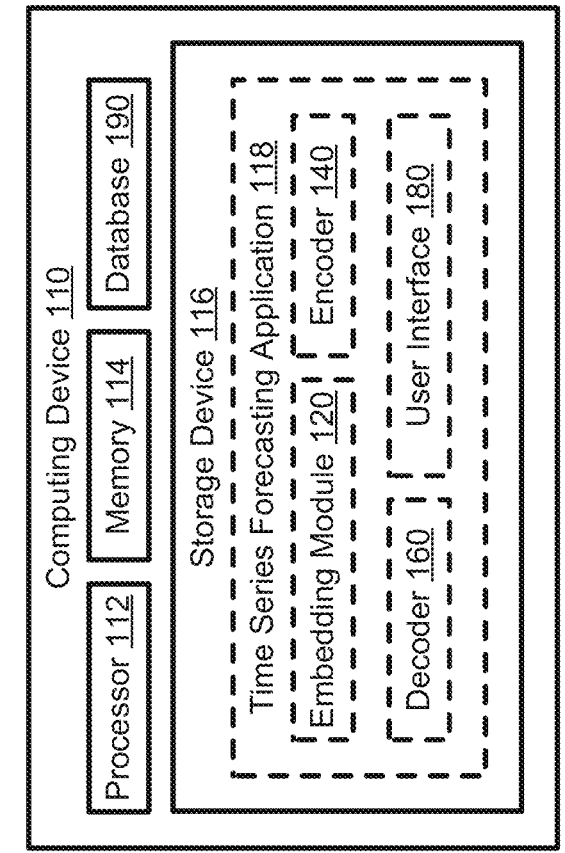
FIG. 1 schematically depicts an LSTM based encoder-decoder for time series forecasting according to certain embodiments of the disclosure.

FIG. 1 schematically depicts a computing system for multi-horizon time series forecasting according to certain embodiments of the present disclosure. As shown in FIG. 1, the system 100 includes a computing device 110. In certain embodiments, the computing device 110 shown in FIG. 1 may be a server computer, a cluster, a cloud computer, a general-purpose computer, a headless computer, or a specialized computer, which provides forecasting services. The computing device 110 may include, without being limited to, a processor 112, a memory 114, and a storage device 116, and optionally database 190. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In certain embodiments, the computing device 110 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110. The storage device 116 includes, among other things, a time series forecasting application 118. The time series forecasting application 118 includes an embedding module 120, an encoder 140, a decoder 160, and a user interface 180. In certain embodiments, the storage device 116 may include other applications or modules necessary for the operation of the time series forecasting application 118. It should be noted that the modules 120, 140, 160 and 180 are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code.

In this embodiments, the processor 112, the memory 114, the storage device 116 are component of the computing device, such as a server computing device 110. In other embodiments, the computing device 110 may be a distributed computing device and the processor 112, the memory 114 and the storage device 116 are shared resources from multiple computers in a pre-defined area.

The embedding module 120 is configured to retrieve or receive categorical variables, for example, from the database 190, and convert the categorical variables to a compact feature vector or namely an input feature vector. As shown in FIG. 2A, the embedding module 120 includes an embedding layer 122, a concatenating layer 124, and a fully-connected layer 126.

The embedding layer 122 is configured to, upon retrieving or receiving the categorical variables, embed the categorical variables into numerical feature vectors. In certain embodiments, the embedding layer 122 is a neural network. The embedding layer 122 may retrieve or receive the categorical variables directly from the database 190 or via the user interface 180. In certain embodiments, the categorical variables are time series training data or historical data, or future data. The data may be categorical data of products on an e-commerce platform. For example, the database 190 may store records or entries of the products on the e-commerce platform. The record may include categorical variables of the products, such as identification of the products, distribution center of the products, and promotion of the products on the e-commerce platform on a daily basis; and the record may also include corresponding output data of the products, such as sales of the products on the e-commerce platform on a daily basis. In certain embodiments, the e-commerce platform may provide a number of distribution centers in a service area, such as 5-10 distribution centers in a country, and each of the distribution centers is designated to serve a covered region. A product sold to the covered region are mainly shipped from the corresponding distribution center, although shipment from other distribution centers may be available when the product is out of stock in the corresponding distribution center. In certain embodiments, a distribution center identification (ID) is a categorical variable used to define where the product is placed, and may be represented by a numerical number having multiple dimensions. The dimensions of the distribution center ID may be defined based on the complexity of the embedding module 120. Category ID is the category index associated with each product. In certain embodiments, the products provided by the e-commerce platform may be categorized to many different classes including snacks, stationary, laptops, appliance, cloths, . . . , and each class is represented by a multi-dimension numerical number. The promotion ID is used to define whether there are promotion available for the product on the specific date, and if available, what type of promotion it is. The type of promotion may include direct discount, gift, price break and bundle deal. In certain embodiments, the input of distribution center, product category, and promotion may be represented as one hot vector, and after embedding are converted to vector has higher dimensions. In certain embodiments, the output (product sales) may also be converted to vectors having the same number of higher dimensions, so that the input vectors and the output vectors can be combined later. In certain embodiments, the embedding layer 122 is a learned dictionary. The embedding layer 122 is configured to, after converting or mapping the categorical variables of a product to feature vectors, send the feature vectors to the concatenating layer 124.

Kindly note each type of product on a specific time step, such as a day, corresponds to multiple categorical variables and thus multiple feature vectors. In certain embodiments, the categorical variables are historical data. In other embodiments for forecasting, the categorical variables are future data. In other words, although we do not know the real sales of the product in the future, we may have ID of the products, storage place of the products, and planned promotion of the products at the current time, which can be used for forecasting.

The concatenating layer 124 is configured to, upon receiving the feature vectors of a product at a time step, concatenate the feature vectors into one long vector. In certain embodiments, when the embedding module 120 is used to prepare inputs for the encoder 140, the concatenating layer 124 further incorporate output, such as sales data of the product at the time step, into the long vector. In certain embodiments, the output such as the sales data is a scalar, and can be concatenated along with the embedded feature vectors. In contrast, when the concatenating layer 124 is used to prepare input for the decoder 140 for forecasting, no output data is available and the concatenating layer 124 only uses the feature vectors from the input category variables of the product. The concatenating layer 124 is further configured to, after obtaining the long vector, send the long vector to the fully-connected layer 126.

The fully-connected layer 126 is configured to, upon receiving the concatenated long vector, learn interactions among different inputs in hidden space to form a compact feature vector or namely input feature vector for each product at one time step, and send the input feature vector to the encoder 140 or the decoder 160. In certain embodiments, the fully-connected layer 126 is a linear transformation in a form of Wx+b. W is a m-by-n matrix, in which m is the length of the long vector from the concatenating layer 124 (input of 126), and n is the hidden size of LSTM (output of 126).

Figure 2C:
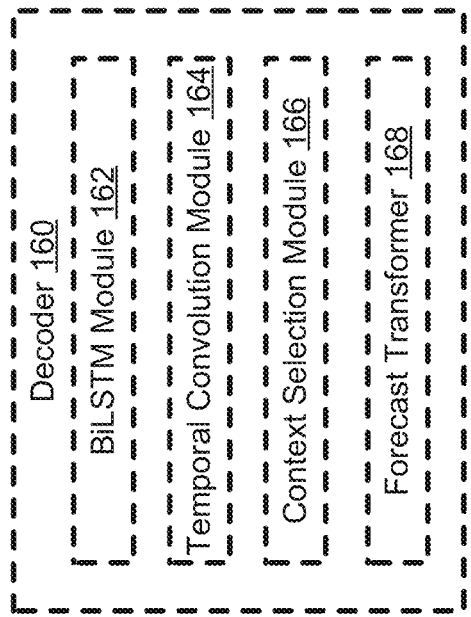
FIG. 2C schematically depicts a bi-directional LSTM (BiLSTM) based decoder for time series forecasting according to certain embodiments of the disclosure.
Figure 2B:
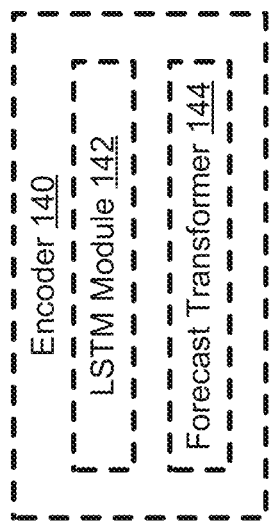
FIG. 2B schematically depicts an LSTM based encoder for time series forecasting according to certain embodiments of the disclosure.

The encoder 140 is configured to, upon receiving the input feature vectors (compact feature vectors) for each product in historical time steps from the embedding module 120, perform LSTM learning to obtain hidden states for each time step. As shown in FIG. 2B, the encoder 140 includes an LSTM module 142 and a forecast transformer 144.

The LSTM module 142, upon receiving the compact feature vectors (the input feature vectors) of the time series, which include corresponding outputs (sales) of the products at the time steps, perform LSTM for each time step to provide a hidden state of that time step, which is also named a forecast output vector corresponding to the next time step. The LSTM module 142 is then configured to send the hidden states (forecast output vectors) to the forecast transformer 144, and also pass on each of the hidden states to the next time step. In certain embodiments, when in forecast operation, the hidden state at the last time step in the encoder 140 is passed onto the decoder 160. In certain embodiments, the LSTM module 142 is a two layer LSTM, where a first layer of the LSTM module 142 is configured to receive the input feature vectors from the embedding module 120 and output an intermediate feature vector, and a second LSTM layer of the LSTM module 142 is configured to receive the intermediate feature vector and output the hidden states (i.e., forecast output vectors) to the forecast transformer 144. These two layers of LSTM have individual parameters.

The forecast transformer 144 is configured to, upon receiving the forecast output vector (i.e., the hidden state) for each time step, convert the forecast output vectors to corresponding forecast output. In certain embodiments, the conversion from the forecast output vector to the corresponding forecast output at a specific time step is performed by linear transformation.

The decoder 160 is configured to, upon receiving the latent hidden state from the last time step of the LSTM module 142 of the encoder 140, and the input feature vector from the fully-connected layer 126 of the embedding module 120 corresponding to future time steps, provide future output forecasting. FIG. 2C schematically depicts a BiLSTM based decoder 160 for time series forecasting according to certain embodiments of the present disclosure. As shown in FIG. 2C, the decoder 160 includes a BiLSTM module 162, a temporal convolutional module 164, a context selection module 166, and a forecast transformer 168.

As described above, the encoder 140 and the decoder 160 share the same embedding module 120. While the feature vectors the embedding module 120 provided to the encoder 140 correspond to both category variables and output of historical time steps, the feature vectors the embedding module 120 provided to the decoder 160 only correspond to category variables of the future time steps, because no output is available for the future time steps.

The BiLSTM module 162 is configured to, upon receiving the input feature vectors of the future time series from the fully-connected layer 126 and the hidden state of the most recent time step from the LSTM module 142, perform LSTM learning to obtain hidden states corresponding to the future time steps, and send the hidden states to the temporal convolutional module 164. Kindly note that the BiLSTM module 146 is a bi-directional LSTM model, where both backward and forward dynamic inputs to be observed at each future time step are allowed.

The temporal convolutional module 164 is configured to, upon receiving the hidden states at different future time steps from the BiLSTM module 162, perform multi-scale temporal convolution on the hidden states, to generate context features of different temporal scales for each future time step. The temporal convolutional module 164 is further configured to, after generating the context features of different temporal scales, send those context features at different scales to the context selection module 166. For example, for each future time step, a set of temporal convolution filters of different sizes (e.g., 1, 3, 5, 7, 11) are applied. For the scale 1 of a target time step, the context temporal convolution module 164 only uses the hidden state of the target time step. For the scale 3 of the target time step, the context temporal convolution module 164 uses three hidden states: the hidden state of the target time step, hidden state of a time step immediately before the target time step, and a hidden state of a time step immediately after the target time step. For the scale 5 of the target time step, the context temporal convolution module 164 uses 5 hidden states: the hidden state of the target time step, hidden states of 2 time steps immediately before the target time step, and hidden states of 2 time steps immediately after the target time step. By the above operation, the context temporal convolution module 164 is configured to obtain context features for each future time step. The context temporal convolution module 164 is further configured to send those context features for the future time steps at different scales to the context selection module 166. In certain embodiments, the number of scales are set in a range of from 1 to 20. In certain embodiments, the number of scales are set in a range of from 3 to 8. In one embodiment, the number of scales are set as 3, 4 or 5. In certain embodiments, the number of scales are recommended based on the previous hidden states.

The context selection module 166 is configured to, upon receiving the context features of different sizes from the temporal convolutional module 164, determine optimal weights of the context features at different sizes, sum the context features using the optimal weights to obtain a multi-scale context feature, and send the multi-scale context feature (vector) to the forecast transformer 168. In certain embodiments, the context selection module 166 is a two layer fully-connected perceptron. In certain embodiments, the weights are calculated from the hidden state of the last time step (or the most recent hidden state) generated by the encoder 140. In certain embodiments, instead of the two layer fully-connected perceptron, the context selection module 166 could be a small neural network having multiple layers. No matter what structure the context selection module 166 has, it is configured to produce the number of contexts as the model needs (e.g., 1, 3, 5, 7 consecutive days to consider). In certain embodiments, the context selection module 166 may calculate the number of scales needed when the decoder 160 receives the most recent hidden states, send the number to the temporal convolution module 164 such that the temporal convolution module 164 only calculate the scales needed for the summation. In certain embodiments, the number of scales needed is predefined, and the context selection module 166 is configured to find the optimal weights of the scales, not to find the number of the scales.

The forecast transformer 168 is configured to, upon receiving the multi-scale context feature vectors from the context selection module 166, convert the multi-scale context feature vectors at different time steps to corresponding forecast outputs. The converting may be performed by a linear transformation, and the parameters of the linear transformation can be learned during training of the time series forecasting application 118.

In certain embodiments, the encoder 140 may optionally include a temporal convolution module and a context selection module the same as or similar to the temporal convolution module 164 and the context selection module 166, and the two optional modules of the encoder 140 perform the same or similar function as that of the modules 164 and 166.

In certain embodiments, a loss function is defined in the time series forecasting application 118 for training the application. The loss function considers the difference between the forecasted outputs (such as forecasted sales) and the actual outputs (actual sales).

As described above, the BiLSTM module 162 uses a bi-directional LSTM backbone, and future input features are propagated in both time order and reverse time order. Further, the forecast output feature in one time step is not directly used for the output forecast in the next time step. By this type of design, the decoder 160 provides accurate forecast without accumulating error. Further, the multi-scale temporal convolution module 164 and the context selection module 166 consider neighboring features at different scales with different weights, which further improves forecast accuracy.

Referring back to FIG. 1, the time series forecasting application 118 further includes a user interface 180. The user interface 180 is configured to provide a use interface or graphic user interface in the computing device 110. In certain embodiments, the user is able to configure parameters for the training of the time series forecasting application 118, that is, parameters of the embedding module 120, the encoder 140, and the decoder 160. The user interface 180 may instruct using historical data, such as the last three years or five years daily input/product feature and output/product sales data to train the time series forecasting application 118, so as to obtain optimal parameters of the application 118. The user interface 180 may instruct using historical data, such as last month's daily data (both input/product feature and output/product sales) to the encoder 140 to obtain the most recent hidden state (last day of the last month), and using current data such as the coming month's daily data (only input/product feature) to the decoder 160 to obtain output/product forecast sales of the coming month.

The database 190 is configured to store historical variable input data and corresponding output data, as well future variable input data. In certain embodiments, some of the stored historical variable input data and output data are used as training data to train the application 118. In certain embodiments, the most recent historical variable input data and corresponding output data are used for performing the encoder 140 to provide hidden state to the decoder 160. In certain embodiments, some of the future variable input data from the database 180 and the hidden state are provided to the decoder 160, so that the decoder 160 can obtain context selection weights based on the most recent hidden state, and provide forecast based on the input data, the most recent hidden state, and the weight. In certain embodiments, the database 180 is stored in computing devices other than the computing device 110, or stored in other computing servers, and the time series forecasting application 118, when in operation, is able to retrieve or receive data from the remote database 180.

In certain embodiments, the modules of the embedding module 120, the encoder 140 and the decoder 160 are designed as different layers of one integrated network, each layer corresponds a specific function. In certain embodiments, the decoder 160 may work with another type of encoder 140 as long as the encoder 140 is able to provide a value for a latent state based on historical data. In certain embodiments, the time series forecasting application 118 may not include an encoder 140, and an initial latent state may be set at an arbitrary value or set at 0 and used as input of the decoder 160.

Figure 3:
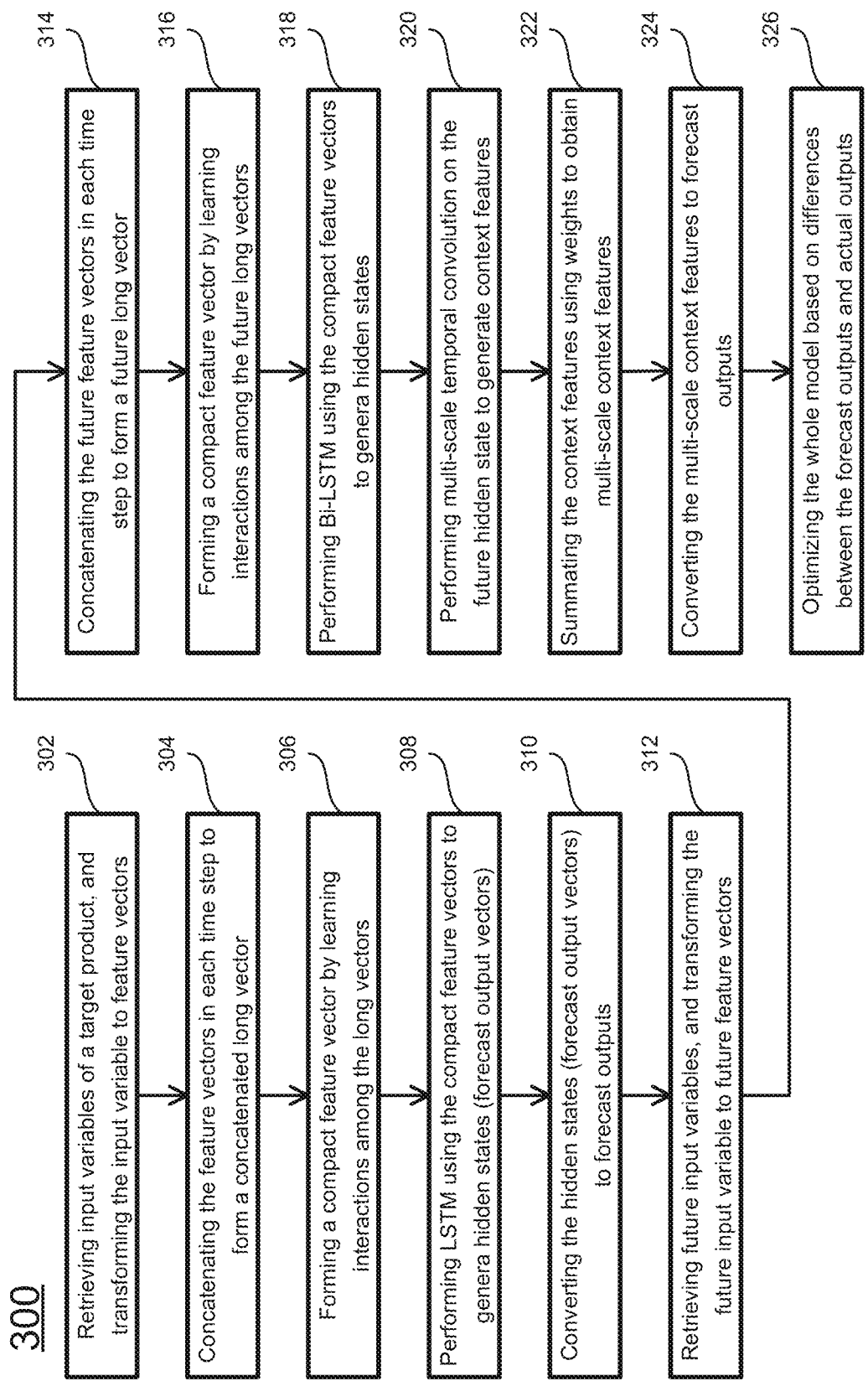
FIG. 3 schematically depicts a process of training a time series forecasting application according to certain embodiments of the disclosure.

FIG. 3 schematically depicts training of a time series forecasting application according to certain embodiments of the present disclosure. In certain embodiments, the training of the application is performed by a computing device, such as the computing device 110 shown in FIG. 1. It should be particularly noted that, unless otherwise stated in the present disclosure, the steps of the training process or method may be arranged in a different sequential order, and are thus not limited to the sequential order as shown in FIG. 3. In this training process, a three year sales data of products are provided, and training for a product or namely a target product is illustrated as follows. The training for all the other products are the same or similar. In certain embodiments, we choose two months data from the three year data for training as follows, and the training using the two month's data is sufficient. In certain embodiments, data from the other months of the three year can be used similarly, so as to further train the application/model. Here the two months data are named the first month and the second month, which are sequential months and have 31 days and 30 days respectively. The data include input data, i.e., categorical variables of the target product and output data, i.e., sales of the target product. The input data and the output data are in a daily basis. The application 118 is defined such that the first month's input/output data are used for training the embedding module 120 and the encoder 140, and the second month's input/output data are used for training the embedding module 120 and the decoder 160. In certain embodiments, we may train the model using different products, such as 32 products as a batch, and data selected for training each product may be different two months' data. In certain embodiments, in the batch training, all products are used to generate losses of all products and these losses are averaged and backpropagated to modules of the entire model to adjust the model weights (or parameters). In prediction stage, when the model is fixed, each product can be independently fed into the model to produce individual output.

At procedure 302, the embedding layer 122 retrieves or receives categorical variables of the target product in the first month in a daily basis, embeds the categorical variables into numerical feature vectors, and sends the feature vectors to the concatenating layer 124. Each day of the first month is named a time step. For each day's data, the categorical variables may include identification of the target product (for example SKU), location of the product in a specific distribution center, specific category of the target product such as toys, cloths, appliance, and the promotion of the product. Each categorical variable may be transformed into one of the feature vectors, and the feature vectors may be one-hot vectors.

At procedure 304, the concatenating layer 124, upon receiving the feature vectors of the target product in the first month, concatenates the feature vectors of the target product and output (for example, a scalar) corresponding to the feature vectors to generate a long vector (with the scalar output as numerical inputs) for each day of the first month or each time step, and sends the long vector to the fully-connected layer 126. In certain embodiments, the concatenating layer 124 retrieves the outputs from the database 190.

At procedure 306, the fully-connected layer 126, upon receiving the long vector in the time step, learns interactions among different inputs of the time step in hidden space on the long vector, forms a compact feature vector as the final representation of the inputs, and sends the compact feature vector (or namely input feature vector) to the LSTM module 142.

At procedure 308, the LSTM module 142, upon receiving the compact feature vector (the input feature vector) for the 31 days of the first month, perform LSTM analysis on the compact feature vectors, and generates hidden states of the time steps, where the hidden states are also forecast output vectors of the time steps. The LSTM module 142 then sends the hidden states (or forecast output vectors) to the forecast transformer 144, and also sends the hidden state at the last day of the first month to the BiLSTM module 162. Kindly note the training is applied to data on one product, and sequentially by time steps. However, in certain embodiments, the steps may be applied to a batch of products in parallel operation, each operation of one product is independent from the operations of the other products.

At procedure 310, upon receiving the hidden state (forecast output vector) for each time step, the forecast transformer 144 converts the hidden state (forecast output vector) to the forecast output of the next time step. That is, by performing LSTM module 142 on one day's categorical variables and sale of a product on that day, the above procedures generates the next day's output.

As described above, the steps 302 to 310 basically describes the training of the encoder part of the application.

At procedure 312, the embedding layer 122 retrieves input categorical variables of the target product in the second month in a daily basis, embeds the categorical variables into numerical feature vectors, and sends the feature vectors to the concatenating layer 124.

At procedure 314, the concatenating layer 124, upon receiving the feature vectors of the target product in the second month, concatenates the feature vectors of the target product to a long vector with numerical inputs for each day of the second month or each of the future time steps, and sends the long vector to the fully-connected layer 126. Kindly note since the procedure is for forecasting, outputs are not available. Although during training, the outputs for the second month are available, they are used in loss function calculation, not as part of inputs of the long vector.

At procedure 316, the fully-connected layer 126, upon receiving the long vector in the future time step, learns interactions among different inputs in hidden space on the long vector, forms a compact feature vector as the final representation of the inputs, and sends the compact feature vector (or namely future input feature vector) to the BiLSTM module 162.

At procedure 318, the BiLSTM module 146, upon receiving the compact feature vectors (the input feature vector) for the 30 days of the second month, as well as the hidden state of day 31 of the first month generated by the encoder 140, perform BiLSTM analysis on the compact feature factors, and generates hidden states of the time steps (here the hidden state is not forecast output vectors) of the time steps. During the BiLSTM, the input feature vectors are propagated in both time order and reverse time order. The BiLSTM module 162 then sends the hidden states to the temporal convolution module 164.

At procedure 320, the temporal convolution module 164, upon receiving the hidden states from the BiLSTM 162, performs temporal convolution on the hidden state for each future time step (day) to generate context features of different temporal scales corresponding to that future time step, and then sends the context features of different temporal scales to the context selection module 166. Each day of the second month has a corresponding set of context features of different temporal scales.

At procedure 322, the context selection module 166, upon receiving context features of different temporal scales for each of the future time steps, attributes a weight for context features of each of the temporal scales, and obtains multi-scale context feature for each future time step by summarizing the context features according to their weights. In other words, for the target product, the multi-scale context feature is a weighted sum of the context features at different scales for each future time step. After calculating multi-scale context feature for each of the future time steps, the context selection module 166 then sends the multi-scale context features to the forecast transformer 168.

In certain embodiments, the weights of the context features with different scales are predetermined by the context selection module 166 based on the most recent hidden state from the encoder 140, that is, the hidden state of day 31 of the first month. In certain embodiments, the context selection module 166 is a two-layer neural network. In certain embodiments, the context selection module 166 is a two layer fully-connected perceptron. In certain embodiments, the number of weights generated equals to the number of scales in the previous procedure. In certain embodiments, the number of scales or the number of weights is a predefined number or a number determined based on the historical data (the first month). In certain embodiments, the number of weights is 2-9. In certain embodiments, the number of weights is 3-6. In certain embodiments, when the number of weight is 3, the scales are scale-1, scale-3, and scale 5. In certain embodiments, when the number of weight is 4, the scales are scale-1, scale-3, scale 5, and scale 7. In certain embodiments, when the number of weight is 5, the scales are scale-1, scale-3, scale 5, scale-7 and scale-9.

At procedure 324, upon receiving the multi-scale context features for each of the future time steps, the forecast transformer 168 converts the multi-scale context features to forecast outputs. Each of the forecast outputs based on one day's inputs is the forecast output of the next day.

As described above, the steps 312 to 324 basically describes the training of the decoder part of the application.

At procedure 326, after a round of operation of the application 118, the application 118 is configured to calculate a loss function based on the difference between the actual output recorded in the database 190 and the forecasted outputs corresponding to the 31 days of the first month and the 30 days of the second month. The loss function is propagated to the application or the model 118, so as to refine the parameters of the model. By repeating the training process and using more data to train the application, optimal parameters can be obtained.

In certain embodiments, after a certain round of training, the parameters of the application or the model 118 are converged, and the application 118 is regarded as well trained.

Figure 4:
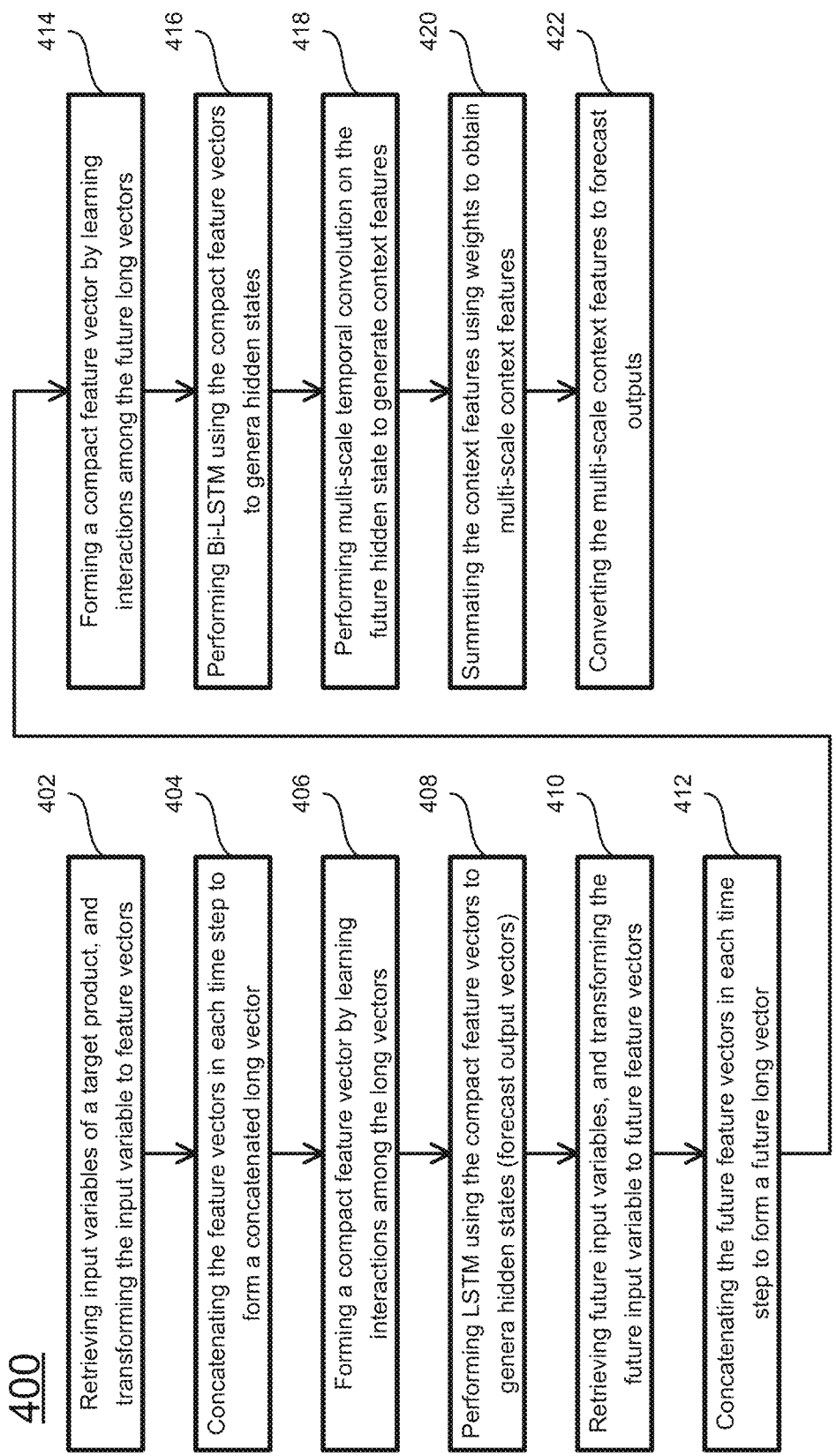
FIG. 4 schematically depicts a process of performing forecast according to certain embodiments of the disclosure.

FIG. 4 schematically depicts a time series forecasting process according to certain embodiments of the present disclosure. In certain embodiments, the forecasting process is performed by a computing device, such as the computing device 110 shown in FIG. 1, and specifically by the time series forecasting application 118. Kindly note the encoder 140 may be replace by other type of encoder, as long as it can provide a most recent hidden state for the decoder 160. In certain embodiments, the application may not include an encoder 140 and the most recent hidden state may be set as 0. It should be particularly noted that, unless otherwise stated in the present disclosure, the steps of the forecasting process or method may be arranged in a different sequential order, and are thus not limited to the sequential order as shown in FIG. 4.

After the application 118 is well-trained, for example using the method shown in FIG. 3, the application 118 is ready for forecasting. In the following forecasting process, two consecutive months' data of a target product are used as examples, the previous month that has product feature inputs and product output/sales, and the coming month that has product feature inputs. The data may be stored in the database 190. The forecast for all the other products are the same or similar. Further, we choose two months data for forecasting, but the time is not limited to. For example, we may also use last two weeks' data and the coming two weeks' data, or last three months' data and the coming three months' data for forecasting, according to the problem to be solved and the characters of the data. In this example, the previous month has 31 days, and day 31 of the previous month is yesterday. The coming month has 30 days, and day 1 of the coming month is today.

At procedure 402, the embedding layer 122 retrieves or receives categorical variables of the target product in the previous month in a daily basis, embeds the categorical variables into numerical feature vectors, and sends the feature vectors to the concatenating layer 124.

At procedure 404, the concatenating layer 124, upon receiving the feature vectors of the target product in the previous month, concatenates the feature vectors of the target product and output corresponding to the feature vectors to generate a long vector for each day of the previous month, and sends the long vector to the fully connected layer 126. In certain embodiments, the concatenating layer 124 retrieves the outputs from the database 190.

At procedure 406, the fully-connected layer 126, upon receiving the long vector, learns interactions among different inputs of the time step in hidden space on the long vector, forms a compact feature vector as the final representation of the inputs, and sends the compact feature vector (or namely input feature vector) to the LSTM module 142.

At procedure 408, the LSTM module 142, upon receiving the compact feature vector (the input feature vector) for the 31 days of the previous, perform LSTM analysis on the compact feature vectors, and generates hidden states (i.e. forecast output vectors) of the time steps. The LSTM module 142 then sends the hidden state at the last day of the previous month (yesterday) to the BiLSTM module 162.

At procedure 410, the embedding layer 122 retrieves input categorical variables of the target product in the current month in a daily basis, embeds the categorical variables into numerical feature vectors, and sends the feature vectors to the concatenating layer 124.

At procedure 412, the concatenating layer 124, upon receiving the feature vectors of the target product in the current month, concatenates the feature vectors of the target product to a long vector with numerical inputs for each day of the current month, and sends the long vector to the fully-connected layer 126.

At procedure 414, the fully-connected layer 126, upon receiving the long vector in the future time step, learns interactions among different inputs in hidden space on the long vector, forms a compact feature vector as the final representation of the inputs, and sends the compact feature vector (or namely future input feature vector) to the BiLSTM module 162.

At procedure 416, the BiLSTM module 146, upon receiving the compact feature vectors (the input feature vector) for the 30 days of the current month, as well as hidden state of from yesterday generated by the encoder 140, perform BiLSTM analysis on the compact feature factors, and generates hidden states of the time steps. During the BiLSTM, the input feature vectors are propagated in both time order and reverse time order. The BiLSTM module 162 then sends the forecast output vectors to the temporal convolution module 164.

At procedure 418, the temporal convolution module 164, upon receiving the hidden states from the BiLSTM 162, performs temporal convolution on the hidden state for each day of the current month to generate context features of different temporal scales, and sends the context features of different temporal scales to the context selection module 166.

At procedure 420, the context selection module 166, upon receiving context features of different temporal scales for each day of the current month, attributes a weight for each temporal scale, and obtains multi-scale context feature for each day by summarizing the context features according to their respective weights. In certain embodiments, the sum of a set of weights is 1. For example, the multi-scales may be scale-1, scale-3 and scale-5, and the corresponding weights may be 0.1, 0.3 and 0.6, respectively. After calculating multi-scale context feature for each of the days in the current month, the context selection module 166 then sends the multi-scale context features (i.e. forecast output vectors) to the forecast transformer 168. In other words, the forecast output vector generated by the encoder 140 is the hidden state in the encoder 140, while the forecast output vector generated by the decoder 160 is the multi-scale context feature.

At procedure 422, upon receiving the multi-scale context features for each day of the current month, the forecast transformer 168 converts the multi-scale context features to forecast outputs. Each of the forecast outputs based on one day's inputs is the forecast output of the next day.

By the above operation, the application 118 is able to provide forecast output or sales of the target product in each day of the current month. The same procedures can also be applied to other products. In other embodiments, the application may make the forecast of a plurality of products in parallel, such as (1) applying the model to many products in a batch and predicts output for all the products or (2) distributing the model to many machines to physically parallelize computing.

Kindly notes that the methods of training and forecasting are not limited to the embodiments shown in FIG. 3 and FIG. 4, and other reasonable variations may be applied.

Figure 5:
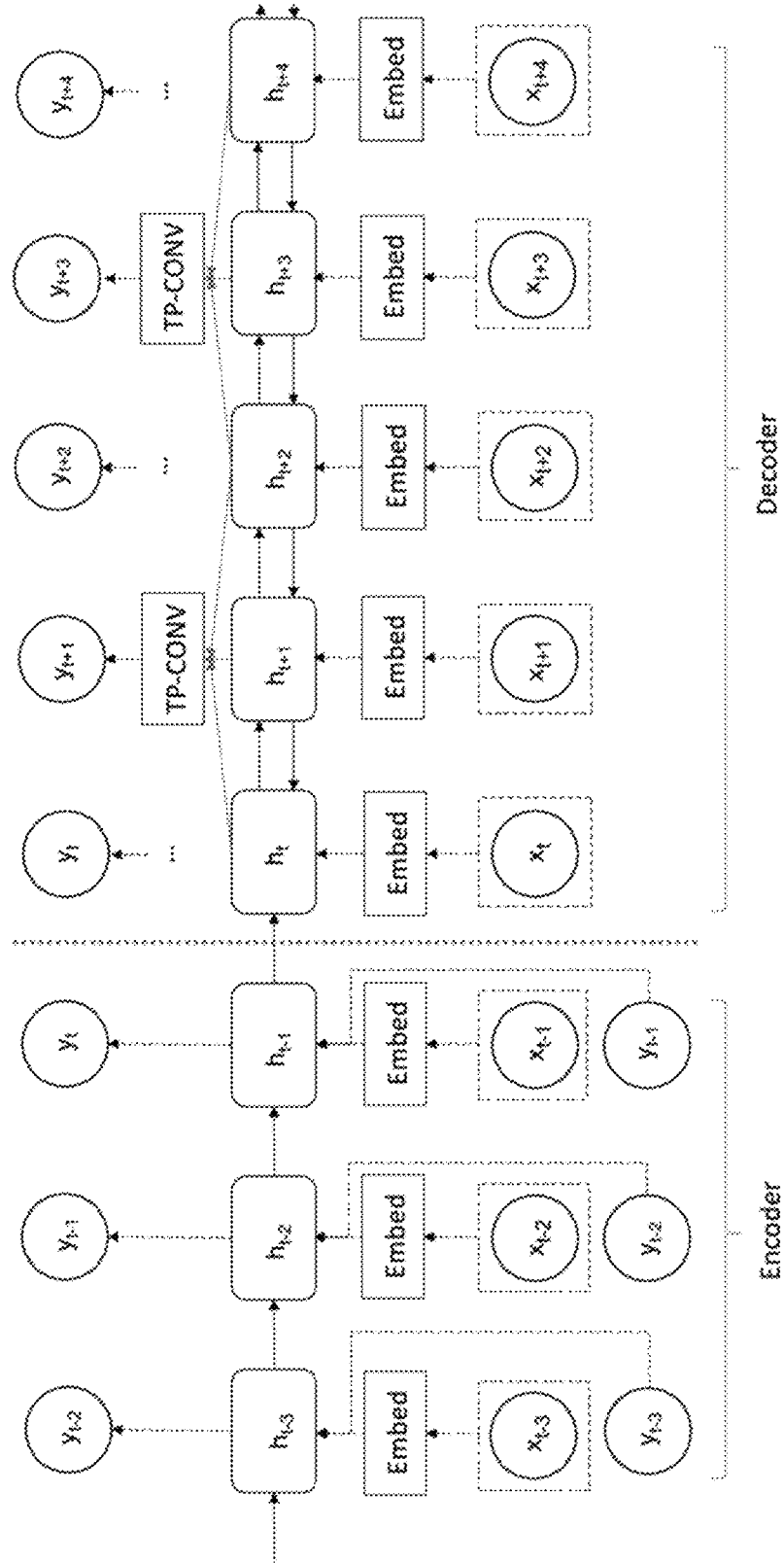
FIG. 5 schematically depicts an LSTM based encoder-decoder for time series forecasting according to certain embodiments of the disclosure.
Figure 6:
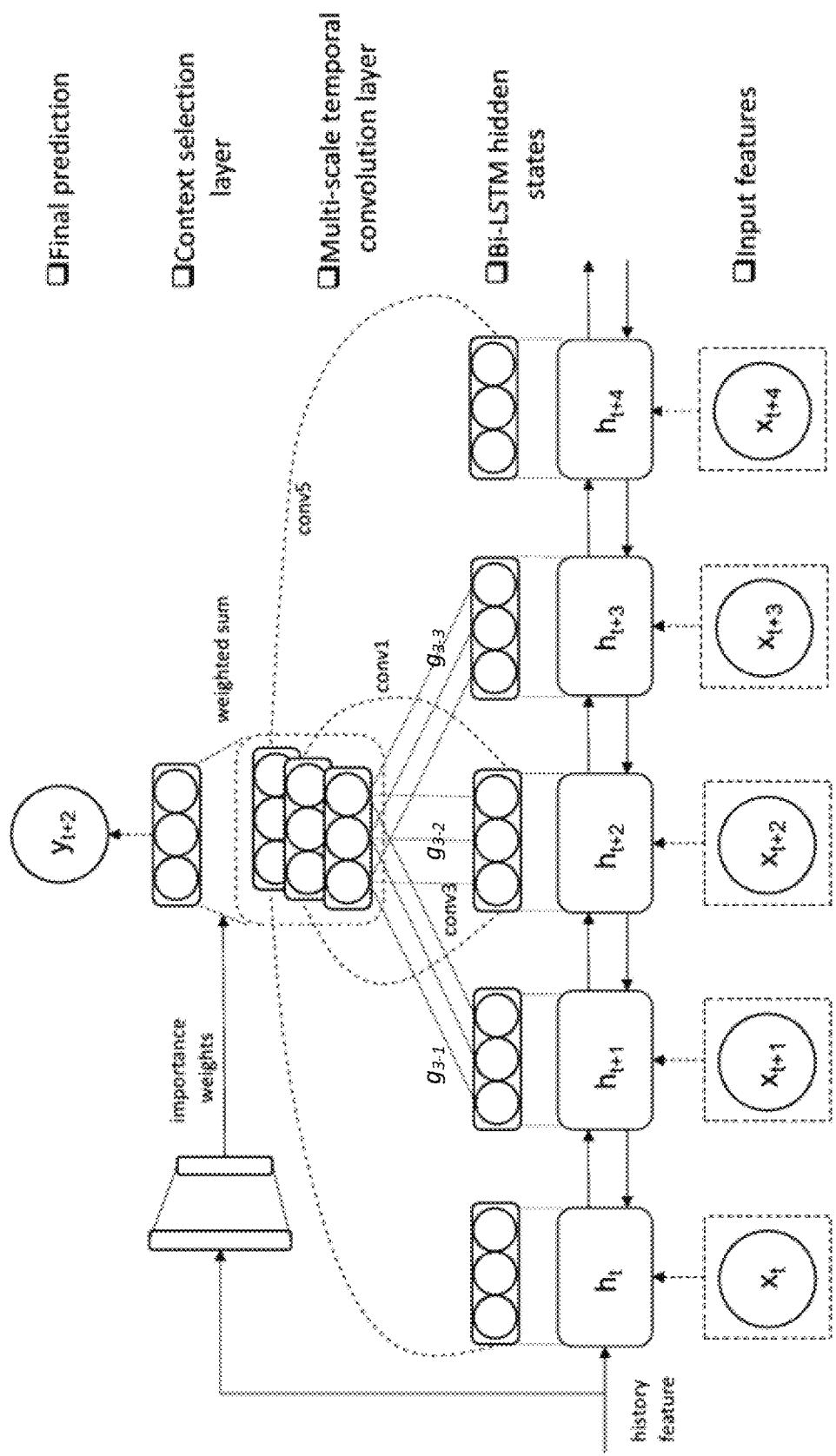
FIG. 6 schematically depicts a bi-directional LSTM (BiLSTM) based decoder for time series forecasting according to certain embodiments of the disclosure.

FIG. 5 schematically depicts an LSTM based encoder-decoder for time series forecasting according to certain embodiments of the present disclosure, and FIG. 6 schematically depicts a bi-directional LSTM based decoder. This sequence-to-sequence learning pipeline encode history and future input variables and decode for future predictions. Kindly note that in FIG. 5, $x_t$ is input at time t, for example product feature data and promotion data of the products; $y_t$ is output at the time t, for example sales data of the products; "Embed" is an embedding module converting the input $x_t$ to an embedded feature vector, which is used as input of LSTM; $h_t$ is hidden state at time t provided by the LSTM; and TP-CONV is temporal convolution.

As shown in FIG. 5, the encoder part is a two-layer LSTM which maps history sequence to latent representations $h_{t-1}$ (typically hidden states at last step) that are passed to the decoder. The decoder is another LSTM that takes the encoded history as its initial state, and uses future inputs to generate the future sequence as outputs.

In certain embodiments, referring to FIG. 6, a bidirectional LSTM (BiLSTM) is used as decoder backbone that propagates future input features both in time order and reverse time order. This structure allows both backward (past) and forward (future) dynamic inputs to be observed at each future time step. Then the hidden states of BiLSTM are fed into a fully-connected layer or a temporal convolution layer to produce final predictions. In certain embodiments, the final prediction is made after information propagation in BiLSTM, in other words, the disclosure does not use prediction results of previous time steps to predict current time step. By separating information propagation stage with prediction stage, error accumulation especially for long-horizon forecasting is prevented. The design of the disclosure is advantageous over MQ-RNN (Wen et al. 2017) whose decoder does not explicitly model temporal patterns in future, and the design of the disclosure is advantageous over POS-RNN (Salinas, Flunkert, and Gasthaus 2017)

which sequentially makes prediction at each horizon with previous predictions as inputs.

Embedding is a feature learning technique which maps categorical variables to numerical feature vectors. For example, the word embedding by Mikolov (Mikolov et al. 2013) is to learn a dictionary which maps vocabulary words to distributed and numerical feature vectors. The embedding layer in neural networks serves as a lookup table, which stores and retrieves learnable feature vectors by category values. In certain embodiments, the disclosure uses embedding layers to transform all categorical input variables to corresponding feature vectors, and concatenates them to one long vector (and optional together with numerical inputs, i.e., when the sales of the product are available for the previous time steps). Then a fully-connected layer is applied on this vector to learn interactions among different inputs in hidden space, and forms a compact feature vector as the final representation of the inputs.

Convolutional Neural Networks (CNNs) have achieved state-of-the-art performance in many fundamental image recognition tasks (Krizhevsky, Sutskever, and Hinton 2012; Long, Shelhamer, and Darrell 2015). The basic idea of CNNs is that local spatial patterns can be captured by learnable 2-D convolutional filters which produce strong responses to such patterns. The disclosure extends the idea to local temporal pattern exploration in forecasting tasks. In certain embodiments, to capture temporal patterns, one dimensional (1-D) convolutional filters are applied on every k neighboring horizons in hidden space in sliding window fashion. The filter size determines the context size k—the number of neighboring horizons to consider at each time. In certain embodiments, the optimal filter size is task dependent and not known a priori. In certain embodiments, the problem is solved by using a set of temporal convolutional filters g of different sizes (e.g., 1, 3, 5, 7, 11) to generate context features of different temporal scales, and then use the context selection layer to combine them to one multi-scale compact feature vector.

FIG. 6 schematically depicts a BiLSTM based decoder for time series forecasting according to certain embodiments of the present disclosure, and specifically illustrates the overall architecture of applying temporal convolutions on each future horizon. Specifically, an example of making future prediction at time point t+2 is considered. The temporal convolutional filter of size 1×3 is denoted as $g_3$, with each element labeled as $g_{3-1}$, $g_{3-2}$, $g_{3-3}$, respectively. To learn a context of three time steps centered on t+2, $g_3$ is applied on hidden outputs h of the BiLSTM decoder such that:

$$\begin{aligned} c_{t+2}^3 &= (h*g_3)(t+2) \\ &= \sum_{j=t+1}^{t+3} h_j \cdot g_3(t+2-j) \\ &= g_3(1)\cdot h_{t+1} + g_3(0)\cdot h_{t+2} + g_3(-1)\cdot h_{t+3} \end{aligned} \quad (1)$$

Where $h_t$ is hidden output at time t. Similarly, convolutional filter $g_5$ of size 1×5 is applied on the neighboring five hidden states. In certain embodiments, a $g_1$ filter is added which considers no context beyond the current time step, for modeling abrupt changes such as peaks or troughs. On top of all hidden context features, a dynamic context selection layer is added, which learns the importance of each temporal scale and combines all of the context features together by weighted sum. This forms the final hidden context feature for prediction.

In certain embodiments, a dynamic context selection layer is provided, which generates sequence-specific importance for different context scales. It first generates an S-dimension importance vector w from encoded history representation $h^e$ by an MLP f with two layers, and then normalizes w by softmax operation:

$$w = f(h^e) \quad (2)$$

$$\alpha_i = \frac{\exp(w_i)}{\sum_{j=1}^{s}\exp(w_j)}$$

where S is the number of context scales considered, $\alpha_i$ is normalized importance of I-th scale. Then context features of different scales (denoted as $c^i$) are weighted by $\alpha_i$ and summed to final multi-scale context feature c.

$$c=\Sigma_{i=1}^{S}\alpha_i c^i \quad (3)$$

This design enables the model to learn temporal scales dynamically, by assigning different weights to different context sizes based on historical observations of the sequence dynamics. Once we have c, we use a linear layer to produce all K quantile estimations efficiently by:

$$y=Wc+b, \text{ where } y\in R^K$$

In certain aspects, neural networks according to the embodiments shown in FIGS. 1-7 are implemented in PyTorch (Paszke et al. 2017) and network parameters are updated by Adam solver (Kingma and Ba 2015) with batch size 32 and fixed learning rate $10^{-3}$ for 100 epochs. In certain examples, it requires about four hours for training on a single NVidia K40 GPU.

In certain aspects, the approach described above is applied to multi-horizon forecasting problems on two large-scale public forecasting datasets: the GOC2018 Sales Forecasting dataset and the GEF2014 Electricity Price Forecasting dataset. It is shown that the design according to certain embodiments of the disclosure is a unified framework, which can generate accurate multi-quantile predictions on datasets of different input types and different objective functions without major changes in architectures or tricks for training.

Example 1

In one example, the architecture of the present disclosure is applied to Global Optimization Challenge 2018 (GOC2018) sales forecasting. GOC2018 online sales dataset (http://jdata.joybuy.com/html/detail.html?id=4) is a public dataset collected from real-world sales data of JD.com—a global online retail company. This dataset provides a total of 6000 time series of daily sales data for 1000 products sold in 6 regions in China from 2016 to 2017. Participants are asked to forecast demand volume of each day of January 2018 for all products in all demand regions. Specifically, quantile predictions are required, and each time series i has its dedicated quantile of interest $q_i$ given in dataset, ranging from 0:85 to 0:99.

Sales forecasting is challenging as multiple factors have to be taken into account simultaneously such as product categories, geographical regions, promotions, etc. The present disclosure briefly introduces available features as both historical and future information provided in the dataset.

Dc—id indicates which distribution center (dc) of the 6 demand regions delivers a particular product. The sales difference of the same product in different regions reflects geographical preferences.

Cat—id is the category index associated with each product. All 1000 products in the dataset are categorized as 96 different classes such as snacks, stationary, laptops, etc.

Promotion—1 ... 4 are four binary variables indicating which promotions are in effect on each day. There are four different types of promotions including direct discount, threshold discount, gift and bundle deal. Promotion events are assumed to be planned ahead and thus available as both history and future input variables.

Following the competition instructions, a normalized total quantile loss is defined to evaluate the forecasts. Firstly, the standard quantile loss function is used to compute the deviation of forecasts from ground truths for each time series i at each future time step (from 2018 Jan. 1 to 2018 Jan. 31). Then we sum up the quantile losses of all steps over the whole future horizons, and normalize by the number of time steps as well as its total true quantity over all future horizons, as follows:

$$L(i) = \frac{\sum_t [q_i(y_{it} - \hat{y}_{it}^{q_i})^+ + (1-q_i)(\hat{y}_{it}^{q_i} - y_{it})^+]}{T \sum_t y_{it}}, \quad (4)$$

where $\hat{y}_{it}^{q_i}$ is quantile prediction of time series i with target quantile $q_i$, and $\Sigma_t y_i t$ is total true quantity. Finally, the total quantile loss of all time series is the sum of normalized quantile losses of all time series i such that $L=\Sigma_i L(i)$, where i=1, 2, ..., 6000.

Underestimating time series with high quantile values (>0.5) results in higher penalties than overestimation, which is brought by the asymmetrical property of quantile loss function. Therefore, the targeted quantile $q_i$ of a product can be interpreted as the "intolerance" of being out of stock, and is determined by its popularity and the targeted inventory level.

In certain embodiments, we train a unified model to produce forecasts for all quantiles by forwarding once, by virtue of the linear output layer which maps the hidden context feature to all K quantiles of interest. During the testing stage, each time series is evaluated on its dedicated quantile only. In certain embodiments, we avoid training separate models for different quantiles because it is inefficient and unnecessary.

Example 2

In another example, the models of the present disclosure is evaluated on the electricity price forecasting task introduced by the Global Energy Forecasting Competition 2014 (GEFCom2014) (Hong et al. 2016). The GEFCom2014 price forecasting dataset contains three years of hourly-based electricity prices from 2011 Jan. 1 to 2013 Dec. 31. The task is to provide future 24-hour forecasts on 12 evenly distributed evaluation weeks. On a rolling basis, ground truth price information for previous rounds can be used as well to predict future rounds. In this dataset, hourly-based estimations of zonal and total electricity loads are two temporal features available in both past and future information. Following the competition instructions, each hourly price forecast should provide the 0.01, 0.02, ..., 0.99 quantile predictions, noted by $q_1$, $q_{99}$. To make our settings comparable with (Wen et al. 2017), we train our models only to provide 5 quantile predictions on 0.01, 0.25, 0.5, 0.75, 0.99, while the remaining 94 quantiles are provided by linear interpolation. The quantile loss of a 24-hour forecast is defined as:

$$L(q_i) = \frac{1}{T} \sum_t [q_i(y_t - \hat{y}_t^{q_i})^+ + (1-q_i)(\hat{y}_t^{q_i} - y_t)^+], \quad (5)$$

where T=24, $y_t$ and $\hat{y}_t$ are ground truth and predicted prices for t-th hour, and $q_i \in \{0.01, 0.25, 0.5, 0.75, 0.99\}$. To evaluate the full quantile forecasts over all evaluation weeks, losses of all target quantiles (99) for all time periods (12 weeks) over all forecast horizons are calculated and then averaged, which is an average of 12×7×99 forecasts in total. A lower loss indicates a better forecast.

EXPERIMENTS on the two examples: We evaluate our forecasting model on two large-scale forecasting datasets in different domains. We also measure the performance contribution of each component of our networks and make an ablation study for feature selection.

TRAINING AND EVALUATION: the details of model training and evaluation are described as follows. There is a total of 6000 time series in the GOC2018 online-sales dataset. Each time series is split into the training and testing part. The training part starts from the beginnings of time series (as early as January 2016) to December 2017, and the testing part covers the 31 days of January 2018. In addition, randomly sampled sets of consecutive days in total of one fifth of the series length per time series are held out as validation series. During training time, we randomly sample a batch of 32 different time series for each iteration. For each sampled time series, we randomly pick a training creation date, then take $T_h$ steps past of creation date as the history and $T_f$ steps after as the future, to form the final training sequence. Validation and testing sequences have the same length as training sequences. We choose $T_h=T_f=31$ for this month-long forecasting task. In real implementation, validation and testing sequences are held out in the data preprocessing step to guarantee no overlapping with training sequences. For the GEFCom2014 electricity price dataset, there is one single long series of electricity price records starting from January 2011 to December 2013. Following the settings of the competition (Hong et al. 2016), we split the time series into 12 shorter training sequences by 12 evaluation creation dates. We train 12 different models on different training sequences, and evaluate forecasting results of 99 quantiles. The average of quantile losses of 12 sequences are reported. On both datasets, we train the models up to 100 epochs while early stopping applies. The best performing models on validation sets are selected to report final performance on testing sets.

BASELINES: We implemented several baselines to characterize the difficulty of forecasting on these datasets and confirm the effectiveness of our approach.

Benchmark directly replicates historical values as future predictions. For online-sales dataset, benchmark predictions for the evaluation month are borrowed from sales quantities of previous month (31 days ago). For electricity price dataset, benchmark predictions on evaluation days are from one day before (24 hours ago).

Gradient-Boosting (Friedman 2001) is a classical machine learning method for regression and classification problems. We use gradient boosting to learn prediction models for all future horizons, and use grid search to find optimal parameters.

POS-RNN (Cinar et al. 2017) is a deep learning approach that applies a position-based attention model to history of the sequence and obtains a softly-attended historical feature. It then uses a combination of historical feature and current hidden state from LSTM decoder for prediction at each future horizon sequentially.

MQ-RNN (Wen et al. 2017) uses LSTM encoder to summarize history of the sequence to one hidden feature, and uses MLPs to make forecasts for all future horizons from the hidden feature together with future input variables. LSTM-Enc-Dec is a basic sequence-to-sequence model which uses a shared LSTM as both the encoder and decoder, and uses MLPs to decode the LSTM hidden outputs to forecasts on all future horizons.

BiLSTM-Dec improves LSTM-Enc-Dec by using a bidirectional LSTM decoder to propagate information of future inputs in both forward and backward directions.

APPROACH according to certain embodiments of the present disclosure. We compared two variants of our proposed models and evaluated their performance quantitatively.

TpConv-RNN is based on BiLSTM-Dec model and further incorporates temporal convolutions (TpConv) to learn multi-scale temporal contexts at each future horizon. We found that using temporal convolutions of scales 1, 3, 5, 7 yields best results on both datasets, and adding more scales would bring either insignificant improvement or decrease in performance especially at boundary horizons. Temporal contexts of different scales are combined by simple summation.

TpConv-D-RNN is based on TpConv-RNN model but uses dynamic context selection layer to combine contexts of different scales with learned importance vector. This sequence-specific, scale-aware importance vector is computed from encoded feature of the history that assigns different weights to different context scales (equation 2). The final multi-scale context vector is obtained by weighted sum of context features of all scales (equation 3).

EXPERIMENT RESULTS: Table 1 shown in FIG. 7 and Table 2 shown in FIG. 8 summarize the experiment results on two forecasting competition datasets. On the online-sales dataset as shown in Table 1, we reported losses of time series with certain quantiles of interests (e.g., 0.85, 0.87, . . . ), as well as the total loss of all time series. We can see that the benchmark result had a total quantile loss of 78.76, even better than the Gradient-boosting method (79.28). POS-RNN produced a lower quantile loss of 78.02, which improved on the benchmark by further exploring history patterns with attention mechanism. MQ-RNN performed worse than POSRNN (78.52 vs. 78.02) as it outputs each future horizon independently and ignores the temporal contexts. Surprisingly, a simple LSTM-Enc-Dec model without too much tuning achieved a loss of 77.40, which is even better than POSRNN. We conclude that LSTM-Enc-Dec outputs prediction at each time step without using the previous step's prediction, while POS-RNN recursively feeds the previous step's prediction for current prediction, which may result in error accumulation. BiLSTM-Dec further lowered the quantile loss to 76.14 by using bi-directional LSTM as decoder, which indicates that observing both the past and future dynamic variables with respect to the future horizons brings benefits for forecasting. Finally, our proposed models yielded the best results. TpConv-RNN explicitly considers the temporal contexts of four scales (1, 3, 5, 7) and achieved a lower loss of 74.58. TpConv-D-RNN is based on the TpConv-RNN and uses additional dynamic context selection layer to better combine contexts of different scales with learned importance vector, and achieved the lowest quantile loss of 74.36.

In certain embodiments, we also made a seasonality study to understand if there existed strong long-term dependencies between the target months of previous years and the target month of evaluation year. However, by training on January records of prior years (2016, 2017) and evaluating on January 2018, our best model achieved a loss of 81.32, worse than the benchmark which is using just the past one month as current prediction. Furthermore, we tried adding month as an additional input variable for training and testing but found that there is no significant influence on the quantile loss. This indicates that short-term information such as promotion and past month's sales have more influence than long-term dependencies if existed.

Figure 10:
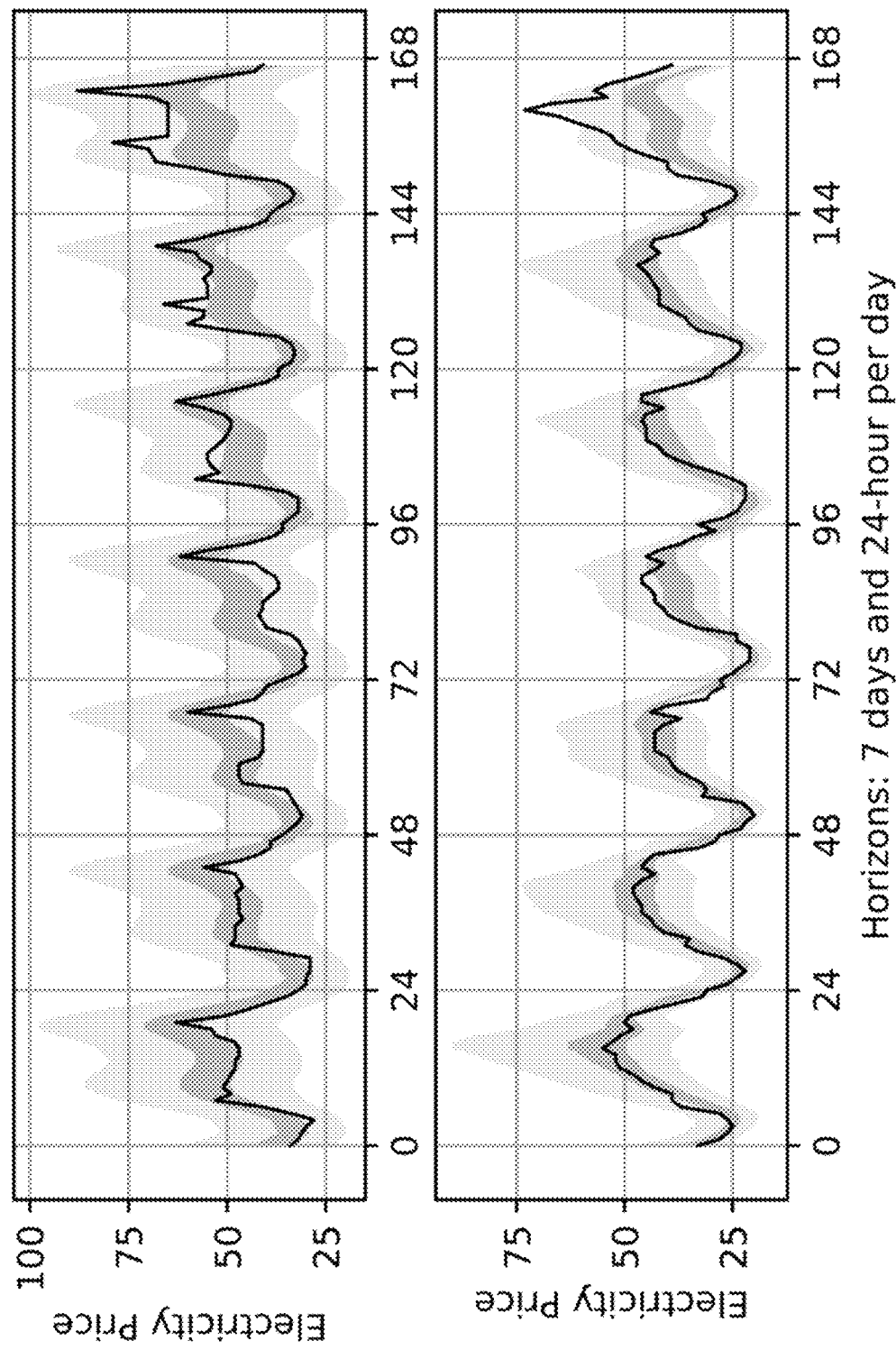
FIG. 10 shows electricity price forecasts according to certain embodiments of the disclosure.

Experiment results for the electricity price dataset are shown in Table 2. We report losses of five output quantiles which are the same as (Wen et al. 2017), and use linear interpolation to extend predictions to all 99 quantiles from 0.01 to 0.99 and report the average. The benchmark method performed the worst (3.67) in terms of total of 99 quantile losses due to high dynamics in the sequence, while gradient boosting had an improved loss of 3.17 due to quantile awareness. POS-RNN performed slightly better (3.05) than gradient boosting, but worse than the official best result of the competition 2.70 (Hong et al. 2016). MQ-RNN achieved current state-of-the-art 2.682. This hourly forecasting task has a fixed evaluation creation time (00:00 at midnight) and cyclic horizons (24 hours), which brings strong temporal dependencies in input variables. As analyzed in (Wen et al. 2017), such temporal patterns can be hard-coded into network structures as in MQ-RNN design. Reasonable predictions can be made solely based on input variables of current time point without considering contexts. This also explains why LSTM-Enc-Dec (2.72) did no better than MQ-RNN (2.68) though the latter has no explicit sequence decoder. Nevertheless, we still found that BiLSTM-Dec, with a more powerful decoder, did marginally better (2.64) than MQRNN (2.68). Finally, the models according to certain embodiments of the present disclosure outperformed all baseline models. TpConv-RNN reduced quantile loss to 2.58 by considering temporal contexts explicitly of different scales, while TpConv-D-RNN achieved the lowest loss of 2.48 by better combining context features with learned importance. In FIG. 10, we show multi-quantile forecasts provided by TpConv-D-RNN on two evaluation weeks, and our model is able to capture distinct temporal patterns on future horizons. Specifically, FIG. 10 shows electricity price forecasts of TpConv-D-RNN on two different evaluation weeks. Dark line shows real price; the lower and upper boundaries of gray areas show quantile forecast of 0.25 and 0.75; the boundaries of light gray areas show quantile forecast of 0.01 and 0.99.

FEATURE STUDY: To analyze and quantify the importance of each input feature, we compare the performance of using different feature combinations as inputs, with the same model TpConv-RNN on the online-sales dataset. Studied features include Distribution Center (Dc-id), Category (Cat-id) and Promotion (Promo). Details of these features have been discussed in the Dataset Description section. By using only Cat-id, Dc-id or Promo as input feature, the quantile losses on validation set were 34.70, 34.55, and 34.23 respectively, indicating an increasing importance of each feature. We concludes that is because Cat-id and Dc-id are static features, while Promo is dynamic. Interestingly, by using both Cat-id and Dc-id as input features, the validation loss went down to 33.94, which is lower than using Promo only. We conjecture that our model learns from category and geographical information the smoothness and trend of each time series, thanks for cross-series learning. The lowest validation loss of 33.82 was achieved by incorporating all three features.

We further analyze the embedding space of product category (Cat-id) to help understand what the network has learned. We randomly choose four categories "Paper," "Mouse," "Milk" and "Roasted nuts," and list their nearest neighbors in Table 3 shown in FIG. 9, with cosine distances smaller than a threshold 0.25 in embedding space. We observe that most neighboring categories have associated semantic labels such as paper and pen, and milk and cereal, indicating that a proper embedding space for product category has been learned by the network. Studying category embedding space could be useful for discovering association rules based on similar sales patterns supervised by history sales, which are incorporated into our model according to certain embodiments of the disclosure.

Further embodiments of the disclosure can be found in the paper "Multi-horizon time series forecasting with temporal attention learning" on KDD '19 Proceedings of the 25th ACM SIGKDD International Conference on Knowledge Discovery & Data Mining, Aug. 4-8, 2019, Anchorage, Ak., USA by Chenyou Fan et al., the content of which is incorporated herein by reference in its entirety.

In summary, certain embodiments of the present application, among other things, provides a novel end-to-end deep-learning framework for multi-horizon time series forecasting, with context learning structures to better capture temporal contexts on future horizons. We show that jointly learning temporal contexts of multiple scales is beneficial for forecasting, and our approach achieves state-of-the-art performance on two large-scale forecasting competition datasets.

In certain aspects, the present disclosure relates to a non-transitory computer readable medium storing computer executable code. In certain embodiments, the computer executable code may be the software stored in the storage device 116 as described above. The computer executable code, when being executed, may perform one of the methods described above.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. BOX, G E P. and JENKINS, G M, Some recent advances in forecasting and control, Journal of the Royal Statistical Society, 1968, Vol. 17, No. 2, pp. 91-109.
2. CINAR, Y G, MIRISAEE, H, et al., Position-based content attention for time series forecasting with sequence-to-sequence RNNS, Advances in Neural Information Processing Systems, 2017.
3. DONAHUE, J, HENDRICKS L A, et al., Long-term recurrent convolutional networks for visual recognition and description, IEEE Conference on Computer Vision and Pattern Recognition, 2015.
4. FRIEDMAN, J H, Greedy function approximation: a gradient boosting machine, Annals of Statistics, 2001, Vol. 29, No. 5, pp. 1189-1232.
5. HOLT, C C, Forecasting seasonals and trends by exponentially weighted moving averages, International Journal of Forecasting, 2004, Vol. 20, Issue 1, pp. 5-10.
6. HONG, T, PINSON, P et al., Probabilistic energy forecasting: Global energy forecasting competition 2014 and beyond, International Journal of Forecasting, 2016, Vol. 32, Issue 3, pp. 896-913.
7. KINGMA, D P, B A, J L, Adam: A method for stochastic optimization, International Conference on Learning Representations (ICLR) 2015.
8. KRIZHEVSKY, A, SUTSKEVER, I, HINTON, G E, ImageNet classification with deep convolutional neural networks, Advances in Neural Information Processing Systems, 2012.
9. LONG, J, SHELHAMER, E, DARRELL, T, Fully convolutional networks for semantic segmentation, 2015 IEEE conference on computer vision and pattern recognition (CVPR), 2015.
10. MIKOLOV, T, SUTSKEVER, I, et al., Distributed representations of words and phrases and their compositionality, Advances in Neural Information Processing Systems, 2013.
11. OORD, A V D, DIELEMAN S, et al., WaveNet: A generative model for raw audio, 2016, arXiv preprint arXiv:1609.03499.
12. PASZKE, A, GROSS, S, et al., Automatic differentiation in PyTorch, 2017.
13. SALINAS, D, FLUNKERT, V, GASTHAUS J, DeepAR: Probabilistic forecasting with autoregressive recurrent networks, 2017.
14. SUTSKEVER, H, VINYALS, O, LE QV, Sequence to sequence learning with neural networks, Advances in Neural Information Processing Systems, 2014.
15. WEN, R, TORKKOLA, K, et al, A multi-horizon quantile recurrent forecaster, 2017, arXiv preprint arXiv: 1711.11053.
16. WINTERS, P, Forecasting sales by exponentially weighted moving averages, Management science, 1960, Vol. 6, No. 3, pp. 324-342.

What is claimed is:

1. A method for time series forecasting of a product, comprising:
providing input feature vectors of the product corresponding to a plurality of future time steps;
performing bi-directional long-short term memory network (BiLSTM) on the input feature vectors to obtain hidden states corresponding to the plurality of future time steps;
for each future time step: performing a plurality of temporal convolutions corresponding to a plurality of temporal scales respectively on the hidden state to obtain context features at the plurality of temporal scales, and summating the context features at the plurality of temporal scales using a plurality of weights to obtain multi-scale context features; and converting the multi-scale context features to obtain the time series forecasting corresponding to the future time steps, wherein the plurality of temporal scales comprises 2-10 scales, wherein the plurality of temporal scales comprises four scales of scale-1, scale-3, scale-5, and scale-7; for each target step from the future time steps: the scale-1 uses hidden state of the target step; the scale-3 uses hidden states of the target step, one of the future time steps immediately before the target step, and one of the time steps immediately after the target step; the scale-5 uses hidden states of the target step, two of the future time steps immediately before the target step, and two of the time step immediately after the target step; and the scale-7 uses hidden states of the target step, three of the future time steps immediately before the target step, and three of the time step immediately after the target step.

2. The method of claim 1, wherein the step of providing input feature vectors comprises:

providing time series input variables corresponding to the plurality of future time steps of the product;

embedding the time series input variables to feature vectors; and for each of the future time step of the product:
concatenating the feature vectors of the time step to obtain a long vector; and
forming one of the input feature vectors from the long vector using a fully-connected layer.

3. The method of claim 1, wherein context features at scale 3 is obtained by:

$$c_{t+2}^3 = g_3(1) \cdot h_{t+1} + g_3(0) \cdot h_{t+2} + g_3(-1) \cdot h_{t+3} \quad (1),$$

wherein $c_{t+2}^3$ is context feature at time step t+2 and scale-3, $h_t$ is hidden output at time t, and $g_3$ is a temporal convolutional filter of size 1×3.

4. The method of claim 3, further comprising obtaining the plurality of weights by:

generating an S-dimension importance vector w by w=f($h^e$), where f is a multilayer perceptron, $h^e$ is encoded history representation of historical data; and normalizing w by softwmax operation:

$$\alpha_i = \frac{\exp(w_i)}{\sum_{j=1}^{S} \exp(w_j)},$$

wherein S is a number of context scales considered, $a_i$ is normalized importance of i-th scale.

5. The method of claim 4, wherein each of the multi-scale context features c is determined by: $c = \sum_{i=1}^{S} \alpha_i c^i$ wherein $c^i$ is context features of different scales.

6. The method of claim 5, wherein output at one of the future time steps is determined using a linear transformation y=Wc+b, wherein y is K quantile estimation, $y \in R^K$, and W and b are learned using the historical data.

7. The method of claim 1, further comprising providing a hidden state of a time step immediately before a first future time step of the future time steps.

8. The method of claim 7, where the hidden state of the time step immediately before the first time step is obtained using a two layer LSTM encoder using input features and outputs corresponding to previous time steps.

9. A system for time series forecasting of a product, comprising:

a computing device, comprising a processor and a storage device storing computer executable code, wherein the computer executable code, when executed at the processor, is configured to:

provide input feature vectors of the product corresponding to a plurality of future time steps;

perform bi-directional long-short term memory network (BiLSTM) on the input feature vectors to obtain hidden outputs corresponding to the plurality of future time steps;

for each future time step: perform a plurality of temporal convolutions corresponding to a plurality of temporal scales respectively on the hidden state to obtain context features at the plurality of temporal scales, and summate the context features at the plurality of temporal scales using a plurality of weights to obtain multi-scale context features; and convert the multi-scale context features to obtain the time series forecasting corresponding to the future time steps, wherein the plurality of temporal scales comprises 2-10 scales, wherein the plurality of temporal scales comprises four scales of scale-1, scale-3, scale-5, and scale-7; for each target step from the future time steps: the scale-1 uses hidden state of the target step; the scale-3 uses hidden states of the target step, one of the future time steps immediately before the target step, and one of the time steps immediately after the target step; the scale-5 uses hidden states of the target step, two of the future time steps immediately before the target step, and two of the time step immediately after the target step; and the scale-7 uses hidden states of the target step, three of the future time steps immediately before the target step, and three of the time step immediately after the target step.

10. The system of claim 9, wherein the computer executable code is configured to provide input feature vectors by:

providing time series input variables corresponding to the plurality of future time steps of the product;

embedding the time series input variables to feature vectors; and for each of the future time step of the product:
concatenating the feature vectors of the time step to obtain a long vector; and
forming one of the input feature vectors from the long vector using a fully-connected layer.

11. The system of claim 9, wherein context features at scale 3 is obtained by:

$$c_{t+2}^3 = g_3(1) \cdot h_{t+1} + g_3(0) \cdot h_{t+2} + g_3(-1) \cdot h_{t+3} \quad (1),$$

wherein $c_{t+2}^3$ is context feature at time step t+2 and scale-3, $h_t$ is hidden output at time t, and $g_3$ is a temporal convolutional filter of size 1×3.

12. The system of claim 11, wherein the computer executable code is further configured to obtain the plurality of weights by:

generating an S-dimension importance vector w by w=f($h^e$), where f is a multilayer perceptron, $h^e$ is encoded history representation of historical data; and normalizing w by softwmax operation:

$$\alpha_i = \frac{\exp(w_i)}{\sum_{j=1}^{S} \exp(w_j)},$$

wherein S is a number of context scales considered, $\alpha_i$ is normalized importance of i-th scale.

13. The system of claim 12, wherein each of the multi-scale context features c is determined by: $c = \sum_{i=1}^{S} \alpha_i c^i$ wherein $c^i$ is context features of different scales.

14. The system of claim 13, wherein output at one of the future time steps is determined using a linear transformation y=Wc+b, wherein y is K quantile estimation, $y \in R^K$, and W and b are learned using the historical data.

15. The system of claim 9, wherein the computer executable code is further configured to provide a hidden state of a time step immediately before a first future time step of the future time steps.

16. A non-transitory computer readable medium storing computer executable code, wherein the computer executable code, when executed at a processor of a computing device, is configured to:
provide input feature vectors of a product corresponding to a plurality of future time steps;
perform bi-directional long-short term memory network (BiLSTM) on the input feature vectors to obtain hidden states corresponding to the plurality of future time steps;
for each future time step: perform a plurality of temporal convolutions corresponding to a plurality of temporal scales respectively on the hidden state to obtain context features at the plurality of temporal scales, and summate the context features at the plurality of temporal scales using a plurality of weights to obtain multi-scale context features; and
convert the multi-scale context features to obtain the time series forecasting corresponding to the future time steps,
wherein the plurality of temporal scales comprises 2-10 scales,
wherein the plurality of temporal scales comprises four scales of scale-1, scale-3, scale-5, and scale-7; for each target step from the future time steps: the scale-1 uses hidden state of the target step; the scale-3 uses hidden states of the target step, one of the future time steps immediately before the target step, and one of the time steps immediately after the target step; the scale-5 uses hidden states of the target step, two of the future time steps immediately before the target step, and two of the time step immediately after the target step; and the scale-7 uses hidden states of the target step, three of the future time steps immediately before the target step, and three of the time step immediately after the target step.

* * * * *